Dec. 20, 1932. C. H. PHELPS 1,891,573
CASTER GAUGE TARGET
Filed Sept. 21, 1931
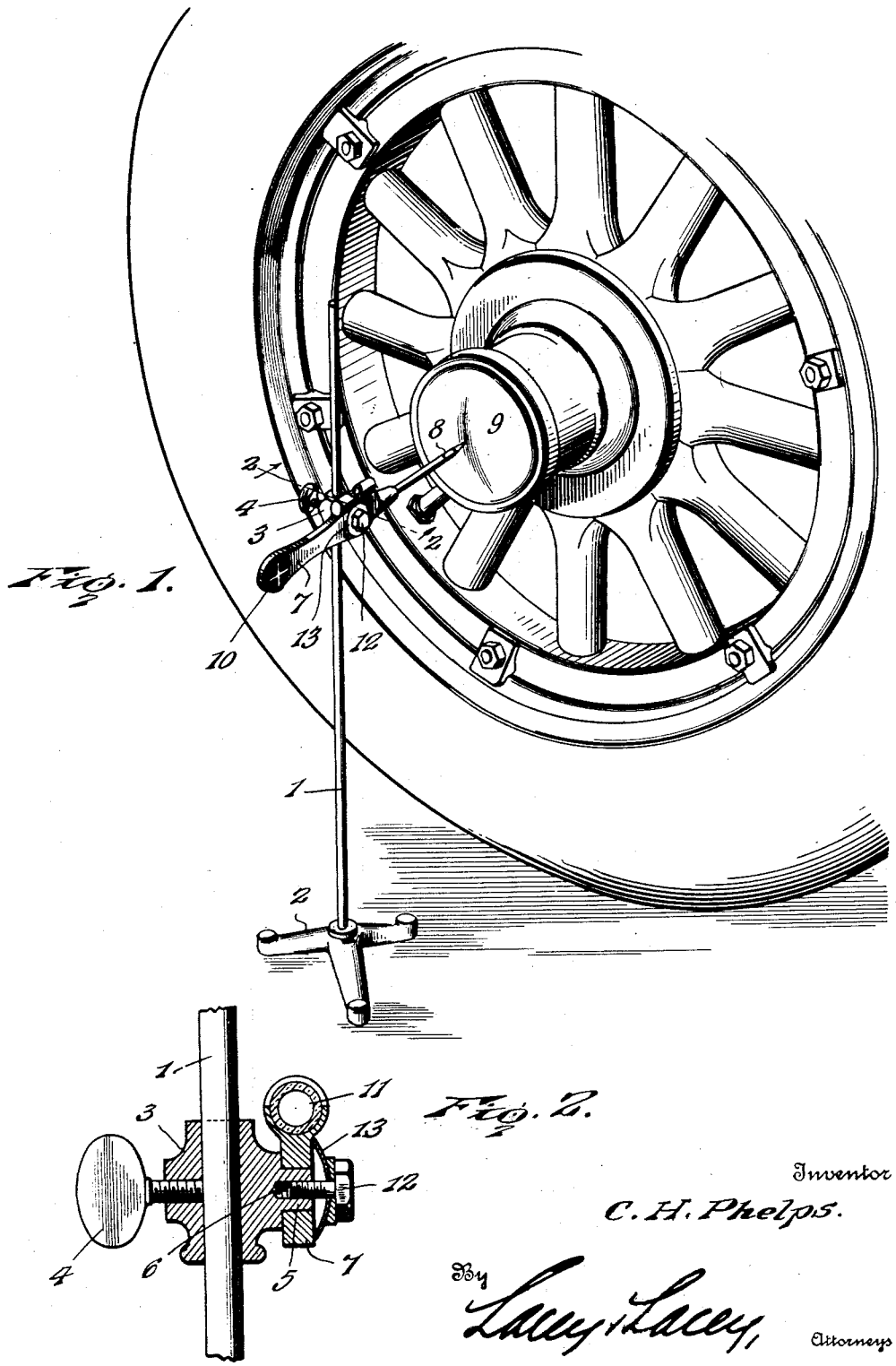

Patented Dec. 20, 1932

1,891,573

UNITED STATES PATENT OFFICE

CLYDE H. PHELPS, OF MOUNT VERNON, NEW YORK, ASSIGNOR TO RIESS MANUFACTURING COMPANY, OF KOKOMO, INDIANA, A CORPORATION OF INDIANA

CASTER GAUGE TARGET

Application filed September 21, 1931. Serial No. 564,193.

In measuring the caster of vehicle wheels, it is desirable, if not absolutely essential, to have the axles of the front and rear wheels of the vehicle in the same horizontal plane and, to accomplish this result, it is the practice to provide a target which is arranged in proper relation to the rear axle and upon which a transit, arranged in proper relation to the front axle, is trained.

The present invention seeks to provide a target of simple construction which may be easily adjusted to the height of the rear axle and which may be accurately sighted through the transit. The invention is illustrated in the accompanying drawing and will be hereinafter fully set forth and defined.

In the drawing:

Figure 1 is a perspective view of a target, embodying the present inventon, showing the same in its operative position.

Fig. 2 is an enlarged detail section on the line 2—2 of Fig. 1.

In carrying out the invention, there is provided a standard 1 which is secured at its lower end in a base 2 which should be of sufficient weight and area to firmly support the standard in an upright position, and in the drawing is shown as consisting of three arms radiating equi-distantly from the standard. The standard is a straight rod of circular section and fitted upon the standard is a collar 3 carrying a set screw 4 which may be turned home against the standard so as to hold the collar at any point in the height of the latter, as will be understood upon reference to Fig. 2. At the side opposite the set screw 4, the collar 3 is formed with a stud 5 which has an internally threaded socket 6 therein and pivotally mounted upon this stud is an index or pointer bar 7, a tapered pin or index pointer 8 being secured in and extending from one end of the bar to engage or bear against the hub cap of a wheel, indicated at 9. At its opposite end, the pointer bar 7 is flattened and vertically enlarged so as to project outwardly from the standard 1 and form a visible target which may be easily viewed through the transit. Upon one side, at its outer end, the bar has a sighting emblem 10 formed thereon, which is shown, and is preferably in the form of a cross, the arms of which are relatively narrow so that it may be caused to aline accurately with the crossed hair lines usually provided in the sight opening in the transit. Immediately over the opening through the bar by which it is fitted upon the stud 5, a spirit level 11 is secured upon the bar, as shown, and a set bolt 12 is engaged in the threaded socket 6 to bear upon a spring washer 13 interposed between the head of the bolt and the side of the bar, as shown clearly in Fig. 2, whereby, when the bolt 12 is turned home, the washer will be caused to exert frictional pressure upon the bar to hold it in a set position although the bar may be readily turned by the application of slight pressure.

The collar 3 is adjusted vertically upon the standard 1 to bring the pointer 8 into the horizontal plane of the axle of the wheel and the set screw 4 is then turned home. The index or pointer bar 7 is pivotally adjusted until the level indicates that it is in a horizontal plane and the tool is then placed in axial alinement with the wheel so that the end of the pin or pointer 8 will bear against the center of the hub cap 9, as will be understood. If, after bringing the index bar into a horizontal plane, the end of the pointer or pin 8 does not aline with the center of the hub cap, of course further vertical adjustment of the collar 3 will be necessary. Having set the target in the manner stated, the transit is arranged adjacent the front wheel of the vehicle and the sight opening thereof trained upon the emblem 10 of the target. The transit is, of course, equipped with a level and is suitably constructed to be properly alined with the center of the front axle so that if, after being properly alined with the axle and trained upon the target, the transit should appear to be out of a horizontal plane it will be at once known that the two axles are not on the same level and proper adjustment of the vehicle may then be effected. It will be readily seen from the foregoing description, taken in connection with the accompanying drawing, that I have provided an exceedingly simple target which may be produced at a very low cost and which may be readily adjusted into its operative position and may be applied to wheels of various diameters.

Having thus described the invention, I claim:

1. A target comprising a support, and an index bar vertically adjustable upon the support and mounted for pivotal movement in a vertical plane, the bar being provided with a pointer at one end and with a sighting emblem on its side at its opposite end.

2. A target comprising a support an index bar vertically adjustable upon the support and mounted for pivotal movement in a vertical plane and provided at one end on its side with a sighting emblem, a pointer projecting from the opposite end of the bar in alinement therewith, and a level upon the bar.

3. A target comprising a standard, a collar mounted on the standard and vertically adjustable thereon and provided upon one side with a stud having an internally threaded socket, an index bar engaged upon said stud, a set bolt engaged in the socket in the stud, a friction device interposed between the head of said bolt and the side of the bar whereby the bar may be held frictionally in a set position against the side of the collar around the stud, a pointer projecting from one end of the bar in alinement therewith, a sighting emblem on the side of the bar at the opposite end thereof, and a level on the bar.

In testimony whereof I affix my signature.

CLYDE H. PHELPS. [L. S.]